E. PHILLIPS.
NOSE BAG.
APPLICATION FILED DEC. 16, 1911.
1,065,268.
Patented June 17, 1913.
2 SHEETS—SHEET 1.
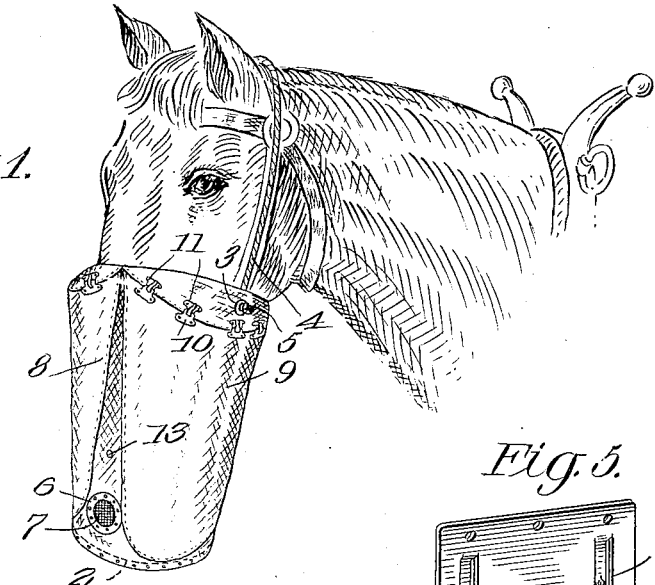
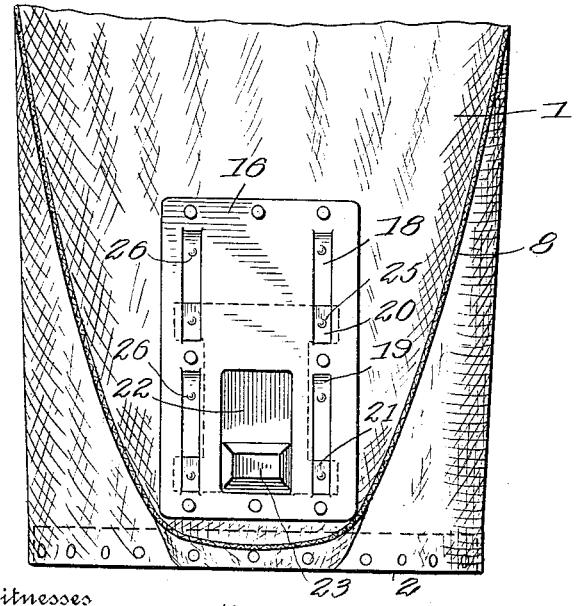
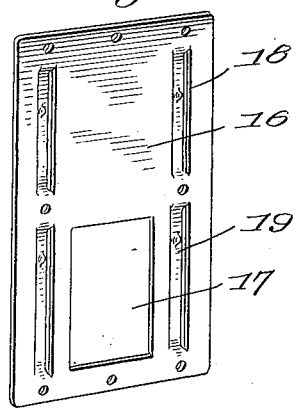
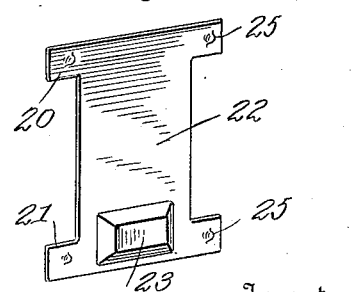
Inventor
Elmer Phillips E. PHILLIPS.
NOSE BAG.
APPLICATION FILED DEC. 16, 1911.
1,065,268.
Patented June 17, 1913.
2 SHEETS—SHEET 2.
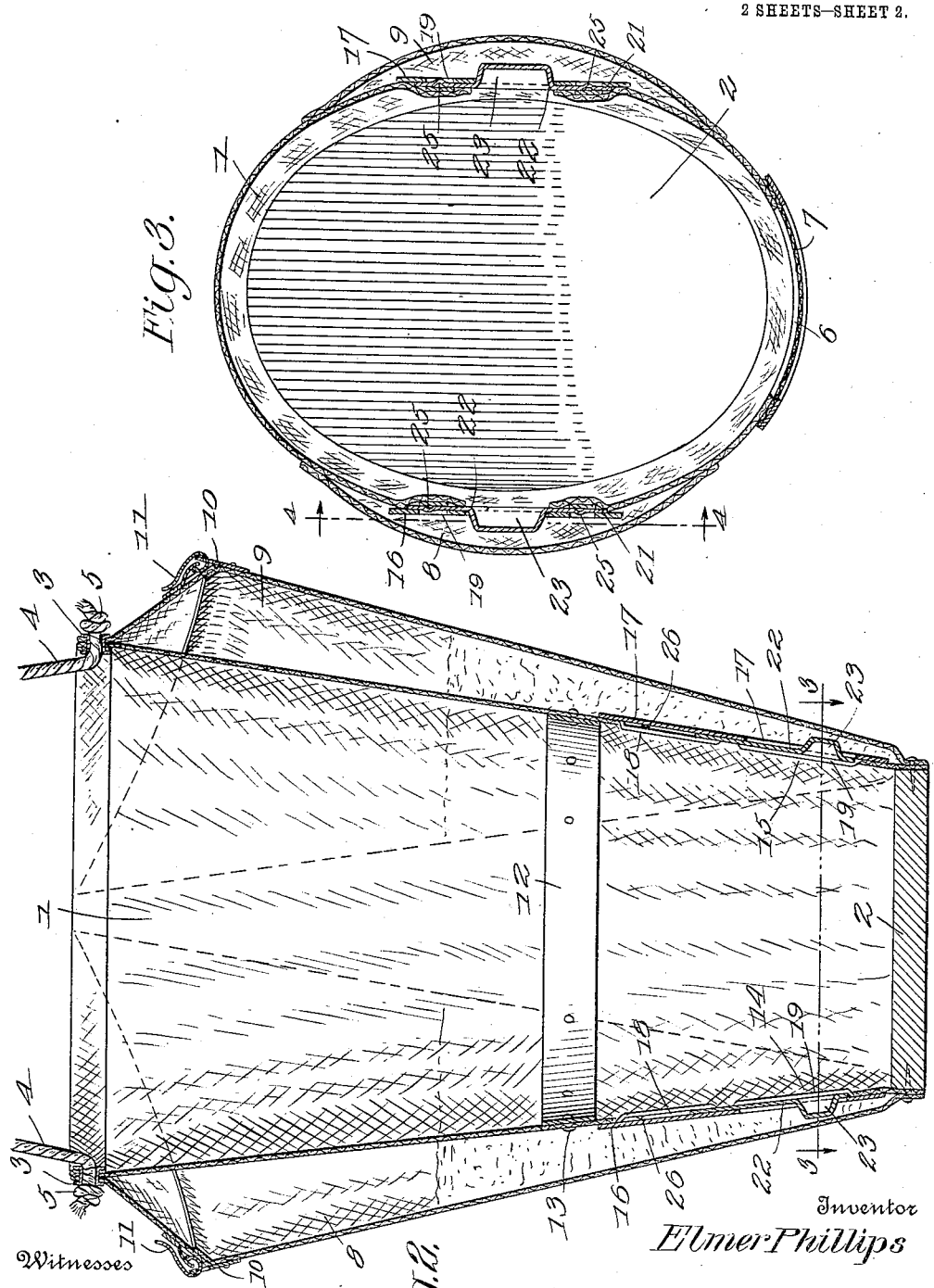
Inventor
Elmer Phillips
By Victor J. Evans
Attorney
Witnesses
Samuel E. Wade

UNITED STATES PATENT OFFICE.

ELMER PHILLIPS, OF ATLANTIC CITY, NEW JERSEY.

NOSE-BAG.

1,065,268.  Specification of Letters Patent.  Patented June 17, 1913.

Application filed December 16, 1911. Serial No. 666,095.

*To all whom it may concern:*

Be it known that I, ELMER PHILLIPS, a citizen of the United States, residing at Atlantic City, in the county of Atlantic and State of New Jersey, have invented new and useful Improvements in Nose-Bags, of which the following is a specification.

This invention relates to certain novel improvements in feed bags for horses, cattle, etc.

In carrying out my invention it is my purpose to provide a feed bag that will be sustained upon the head of the animal which will prevent the feed contained therein being spilled or wasted owing to the tossing or movement of the animal to which the bag is attached.

A further object of the invention is to provide a bag of this class having oppositely arranged hoppers for the reception of the feed, the said hoppers being provided with gates or valves whereby a certain amount of feed is permitted to enter the bag proper, thus forcing the animal to eat slowly so that the feed will be properly digested.

A still further object of the invention is to provide a bag of this character which is provided with compartments for the reception of the feed, the said compartments being normally closed at both the top and the inlet openings to the bag whereby the hoppers after receiving a certain amount of feed may be transported without danger of the feed being accidentally spilled or removed from the hoppers.

For the purpose of explaining the invention the accompanying drawings illustrate a satisfactory reduction of the same practice, but the important instrumentalities of the device may be varied, and so it is to be understood that the invention is not limited to the specific arrangement and organization shown and described.

In the drawings, Figure 1 is a view illustrating the improved feed bag upon the head of an animal. Fig. 2 is a central transverse sectional view of the bag removed. Fig. 3 is a sectional view taken upon the line 3—3 of Fig. 2. Fig. 4 is a sectional view taken upon the line 4—4 of Fig. 3. Fig. 5 is a perspective view of one casing for one of the slides. Fig. 6 is a perspective view of one of the slides.

Referring now to the drawings in detail the numeral 1 designates a nose bag forming part of the present invention. The bag 1 is preferably constructed of suitable fabric, the same being of a frusto-conical formation and being provided with a preferably wooden bottom 2. The bag proper is secured to the bottom 2 in any desired manner, the employment of tacks or other headed elements being illustrated in the drawings. The upper extremity of the bag is open and has oppositely disposed eyes 3 arranged upon opposite sides of the bag proper. These eyes 3 are adapted for the reception of a cord 4, the said cord having its ends formed with knots 5 whereby the said bag may be suspended either from the head of an animal or from a suitable support when the said bag is not applied to the animal. The bag 1 has its front face provided with openings 6, the same being closed through the medium of reticulated plates or wire meshings 7, the said plates or meshing being sustained upon the bag through the medium of metallic rings which are pivotally connected with both the plates and with the bag. The bag may be provided with one or two of these ventilating openings and the said openings are adapted to serve as an entrance for air to the nose of the animal. The numerals 8 and 9 designate compartments which are arranged upon the opposite sides of the bag 1. These compartments are also constructed of fabric, and have their lower ends closed, while their upper and open ends are provided with a plurality of hooks 10 which are adapted to receive spring clips 11, the latter being attached to the sides of the bag proper.

The bag, above the air inlet openings, is formed with a reinforcing ring 12, the same being preferably constructed of metal and being secured to the bag through the medium of rivets 13.

The bag 1 is provided upon its lower sides with openings 14 and 15, the same being arranged within the pockets adjacent the lower extremities thereof.

The numerals 16 and 17 designate guide plates which are connected to the bag, within the pockets and which surrounds the openings 14 and 15. These plates each comprise substantially rectangular metallic members, each of the same being centrally provided adjacent its lower portion with a rectangular opening 17, while the vertical members of the said plates upon the opposite sides of the said opening are slit to provide resilient ways 18 and 19 for the reception of offset tongues 20 and 21 provided upon a slide 22. The slide 22 also comprises a rectangular member and the lower portion thereof is outwardly bulged as at 23 to form a finger hold whereby the said slide may be slid to close or disclose the opening in the guide plates of the bag. The offset fingers of the sliding element or door are each preferably formed with indentations 25, and the said indentations are adapted to engage with projections 26 formed in the spaces or ways of the guide plate. These indentations and projections are adapted to sustain the slide or door either in open or closed position, and from the above description taken in connection with the drawings it will be noted that the slides or doors may be sustained to permit of a determined amount of feed passing from the pockets through the openings of the bag in accordance with the adjustment of the said slides or doors. It will be further noted that by providing the pockets with the eyes and clasps therefor, that a desired amount of feed may be carried within the said pockets without permitting of the same entering the bag proper.

Having thus described the invention what I claim as new is:—

A feed bag provided with a compartment, said bag having an opening communicating with the compartment, a rectangular plate filling the opening and secured to the bag, said plate being constructed of resilient material and having an opening communicating with the opening of the bag, the plate adjacent its vertical edges being provided with slits arranged in pairs, the metal formed therebetween exerting a tension in one direction, the said metal being further provided with projections, and a sliding plate providing a door having offset fingers formed with indentations arranged between the slits providing the ways, the said projections and depressions adapted to engage with each other to sustain the door either in its open or closed position, substantially as and for the purpose set forth.

In testimony whereof I affix my signature in presence of two witnesses.

ELMER PHILLIPS.

Witnesses:
  CHAS. E. FELL,
  JOHN F. X. RIES.

---

Copies of this patent may be obtained for five cents each, by addressing the "Commissioner of Patents, Washington, D. C."